(12) United States Patent
Houskamp

(10) Patent No.: US 6,433,331 B1
(45) Date of Patent: Aug. 13, 2002

(54) PHOTO DETECTOR ALIGNMENT DEVICE

(75) Inventor: Robert W. Houskamp, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/352,090

(22) Filed: Jul. 14, 1999

Related U.S. Application Data

(60) Provisional application No. 60/092,756, filed on Jul. 14, 1998.

(51) Int. Cl.[7] .................................................. G02B 7/00
(52) U.S. Cl. .................................... 250/239; 250/223 R
(58) Field of Search ................................ 250/239, 216, 250/223 R, 559.29, 559.3; 359/822, 873, 872

(56) References Cited

U.S. PATENT DOCUMENTS

| 2,031,054 A | 2/1936 | McCarthy |
| 2,147,156 A | 2/1939 | Geffcken et al. |
| 2,235,590 A | 3/1941 | Rockwell, Jr. |
| 2,974,777 A | 3/1961 | Marsh |
| RE26,915 E | 6/1970 | Cade |
| 3,535,539 A | 10/1970 | Malespina et al. |
| 3,819,272 A | 6/1974 | Crozier et al. |
| 3,897,139 A | * 7/1975 | Caruolo et al. .............. 359/873 |
| 4,412,129 A | 10/1983 | Duncan |
| 4,445,044 A | * 4/1984 | Buess ..................... 250/559.29 |
| 5,446,281 A | 8/1995 | Taranowski et al. |
| 5,492,215 A | 2/1996 | Affeldt et al. |
| 5,582,286 A | 12/1996 | Kalm et al. |
| 5,694,257 A | * 12/1997 | Arnone et al. .............. 359/822 |
| 5,798,879 A | 8/1998 | Salvio |
| 5,956,188 A | * 9/1999 | Lee ............................. 359/822 |

* cited by examiner

Primary Examiner—John R. Lee
(74) Attorney, Agent, or Firm—Van Dyke, Gardner, Linn & Burkhart, LLP

(57) ABSTRACT

An alignment device for aligning a photo-detector with a target on a conveyor includes a mount for the photo-detector having at least two apertures. Screws are inserted through those apertures into corresponding apertures in a bracket attached to the conveyor. The screws are threadedly secured to one of the mount and bracket and non-threadedly secured to the other of the mount and bracket such that rotation of either of the screws alters the distance between the mount and the bracket. The alteration in distance changes the orientation of the photo-detector. Springs may be mounted between the bracket and the mount.

27 Claims, 3 Drawing Sheets

PHOTO DETECTOR ALIGNMENT DEVICE

This application claims priority to U.S. Provisional Application Ser. No. 60/092,756, filed Jul. 14, 1998, entitled Photo Detector Alignment Device.

BACKGROUND OF THE INVENTION

This invention relates generally to devices and methods for aligning a photoelectric light-emitting device with a target, and more particularly to an alignment method and device for use with a conveyor.

It is well known to use photoelectric devices positioned alongside a conveyor for monitoring the movement of packages or other articles on the conveyor. Typically, the photoelectric device emits a beam of light or infrared signal across the conveyor perpendicular to the direction of motion of the conveyor. A target or reflector positioned on the opposite side of the conveyor is hit by the light or other signal and either reflects the light back to the emitting device or detects the light.

In either case, packages traveling on the conveyor will interrupt the beam of light when they pass by. The interruptions are sensed by the photoelectric device and thereby allow the packages to be monitored.

In order for the photoelectric device to operate properly, it is necessary that the beam of light, or other electromagnetic radiation, is properly pointed toward the reflector or target on the other side of the conveyor. If the photoelectric device is not properly aligned with the target/reflector, the light will miss the target/reflector and not be detected. When securing the photoelectric device to the side of the conveyor, it is therefore critical that it be precisely oriented so that the signal it emits will hit the target/reflector.

In the past, the alignment of the photoelectric emitter and the target/detector has been relatively cumbersome and difficult. In particular, past methods have required the use of two hands: one hand to hold the emitter in proper alignment and the other hand to tighten the emitter to the side of the conveyor. Additionally, the emitter must be partially tightened prior to its complete tightening in order to ensure that it does not move freely around during the alignment process. Finally, the tightening of the emitter to the side of the conveyor typically jerks the emitter around as it is tightened, rather than smoothly maintaining the desired alignment. The desirability of an alignment method or device that overcomes these disadvantages therefore can be seen.

SUMMARY OF THE INVENTION

An alignment device according to one aspect of the present invention includes a mounting plate, a fixed bracket spaced from the mounting plate, and a plurality of screws attached across the mounting plate to the fixed bracket. The screws are attached to the bracket and mounting plate in such a fashion that rotation of one or more screws alters the orientation of the mounting plate with respect to the fixed bracket. An emitter fixedly attached to said mounting plate will therefore also have its orientation altered when the screws are adjusted. The orientation of the emitter can thus be adjusted by selectively tightening or loosening one or more of the screws until the signal emitted by the emitter is properly aimed at the target or reflector.

The device and method of the present invention overcomes the disadvantages of the prior alignment techniques and devices. The present invention allows alignment of the emitter without the necessity of using two hands. Because the mounting plate, to which the emitter is fixedly secured, is already mounted to the fixed bracket, the present invention does not require holding the emitter while it is aligned. Moreover, the adjustment of the screws results in a smooth change in the orientation of the emitter, thereby alleviating the prior problem of jerky movement of the emitter. These and other benefits, objects, and results of the present invention will be apparent to one skilled in the art, in light of the following specification when read in conjunction with the accompanying drawings.

DESCRIPTION OF THE PREFERRED EMBODIMENTS

Figure 1:
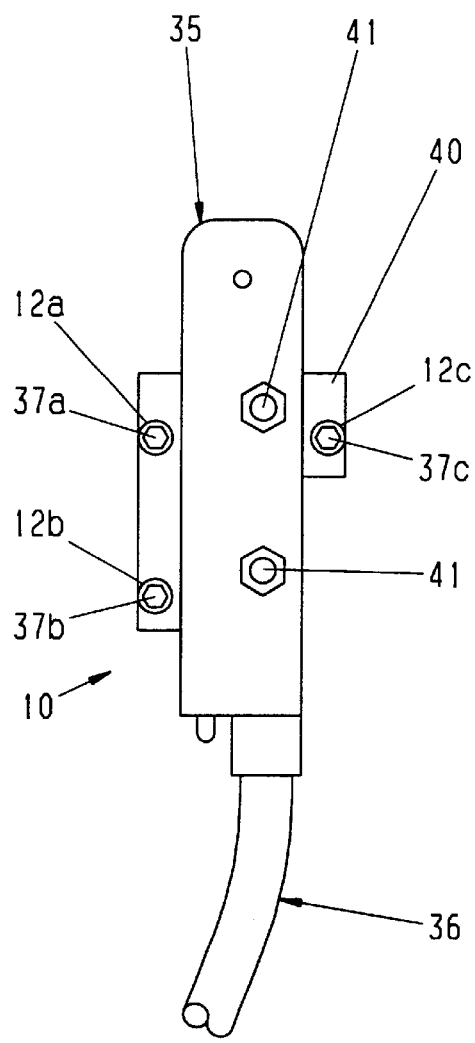
FIG. 1 is a front, elevational view of a first embodiment of an alignment device shown with a photoelectric emitting device attached.

The present invention will now be described with reference to the accompanying drawings, wherein like reference numerals correspond to like elements in the several drawings. An alignment device 10 is depicted in FIG. 1 with a photo emitter 35 attached. Alignment device 10 includes a mounting plate 40 to which photo emitter 35 is securely attached by a pair of attachment screws 41 and 42. As can be seen in FIG. 1, mounting plate 40 is shaped generally like an inverted L. Mounting plate 40 includes three screw holes 12a, 12b, and 12c, through which three adjusting screws 37a, 37b, and 37c are inserted. Screw holes 12a, 12b, and 12c are not threaded, but are rather smooth and of slightly larger diameter than the shaft portion of adjusting screws 37a, 37b, and 37c. The rotation of adjusting screws 37 therefore does not alter the position of adjusting screws 37 with respect to mounting plate 40.

Adjustment screws 37a, 37b, and 37c are also attached to a fixed bracket 14. Fixed bracket 14 may either be an integral part of a side of a conveyor, or it may be a separate bracket that is attached to the side of the conveyor by any suitable means. A plurality of locking nuts 39 are inserted into a plurality of holes defined in fixed bracket 14. Locking nuts 39 are internally threaded to mate with adjusting screws 37a, 37b, and 37c. Each adjustment screw 37 is surrounded by a tensioning spring 38 positioned between mounting plate 40 and fixed bracket 14. Tensioning springs 38 ensure that mounting plate 40 is pushed up against the heads of adjusting screws 37. If one or more of adjusting screws 37 are tightened, mounting plate 40 will be moved closer to fixed bracket 14. If one or more adjustment screws 37 are loosened, tensioning spring 38 will ensure that mounting plate 40 is moved away from fixed bracket 14. By varying which adjustment screws are tightened or loosened, the orientation of mounting plate 40 with respect to fixed bracket 14 can be adjusted. The orientation of mounting bracket 40, in turn, controls the orientation of photo emitter 35.

Figure 2:
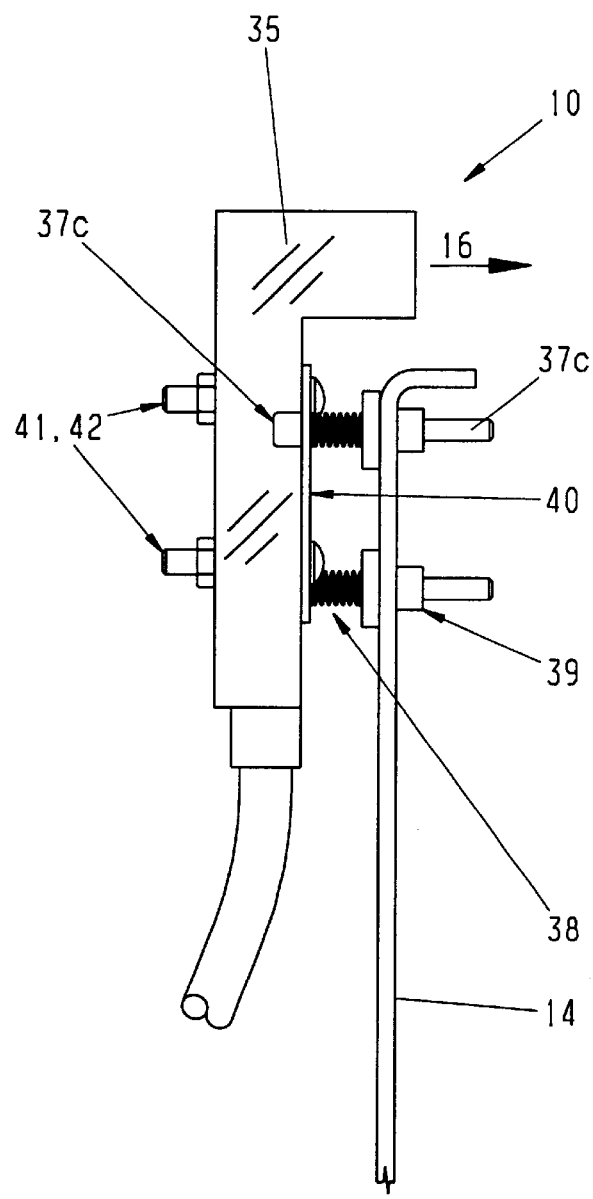
FIG. 2 is a side, elevational view of the alignment device of FIG. 1, also shown with a photoelectric emitter attached.

The configuration of screw holes 12a, 12b, and 12c in mounting plate 40 generally defines a right triangle when the holes are connected. In other words, the holes are defined at the vertices of a right triangle. This configuration allows the vertical and horizontal alignment of photo emitter 35 to be independently adjusted by separate adjustment screws. For example, photo emitter 35 emits a beam or signal 16 as illustrated in FIG. 2. In order to move this emitted beam vertically upward, adjustment screw 37b is tightened. To move this emitted beam vertically downward, adjustment screw 37b is loosened. In order to move emitted beam 16 back and forth horizontally, adjustment screw 37c is either tightened or loosened. Adjustment screw 37a chiefly serves to establish the desired spring force in the tensioning springs. Adjustment screw 37a also forms the pivot about which mounting plate 40 tilts when adjustment screws 37b and 37c are adjusted.

Figures 3, 4:
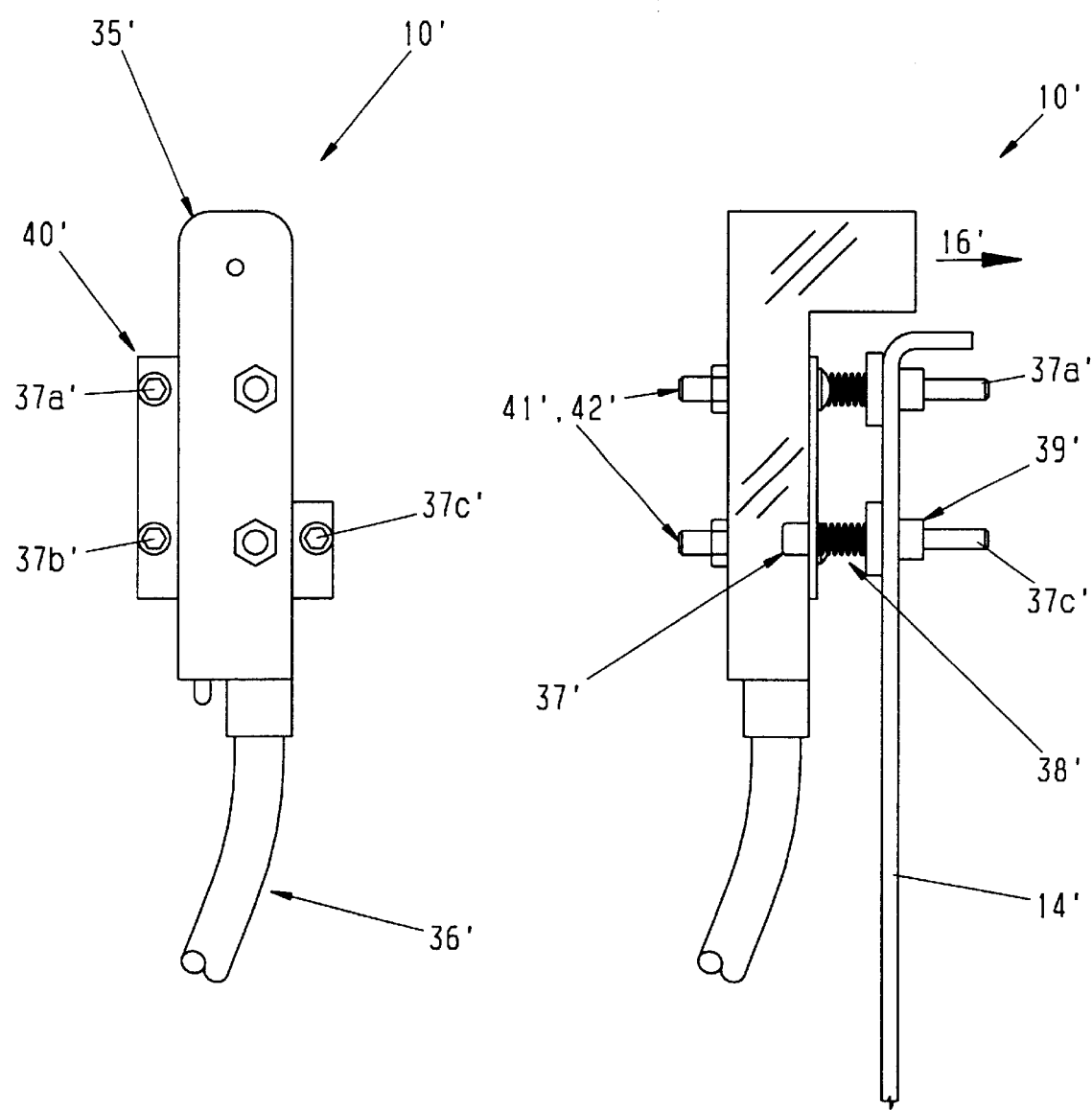
FIG. 3 is a front, elevational view of a second embodiment of the alignment device of the present invention shown with a photoelectric emitter attached.
FIG. 4 is a side, elevational view of the alignment device of FIG. 3, also shown with a photoelectric emitter attached.
Figure 5:
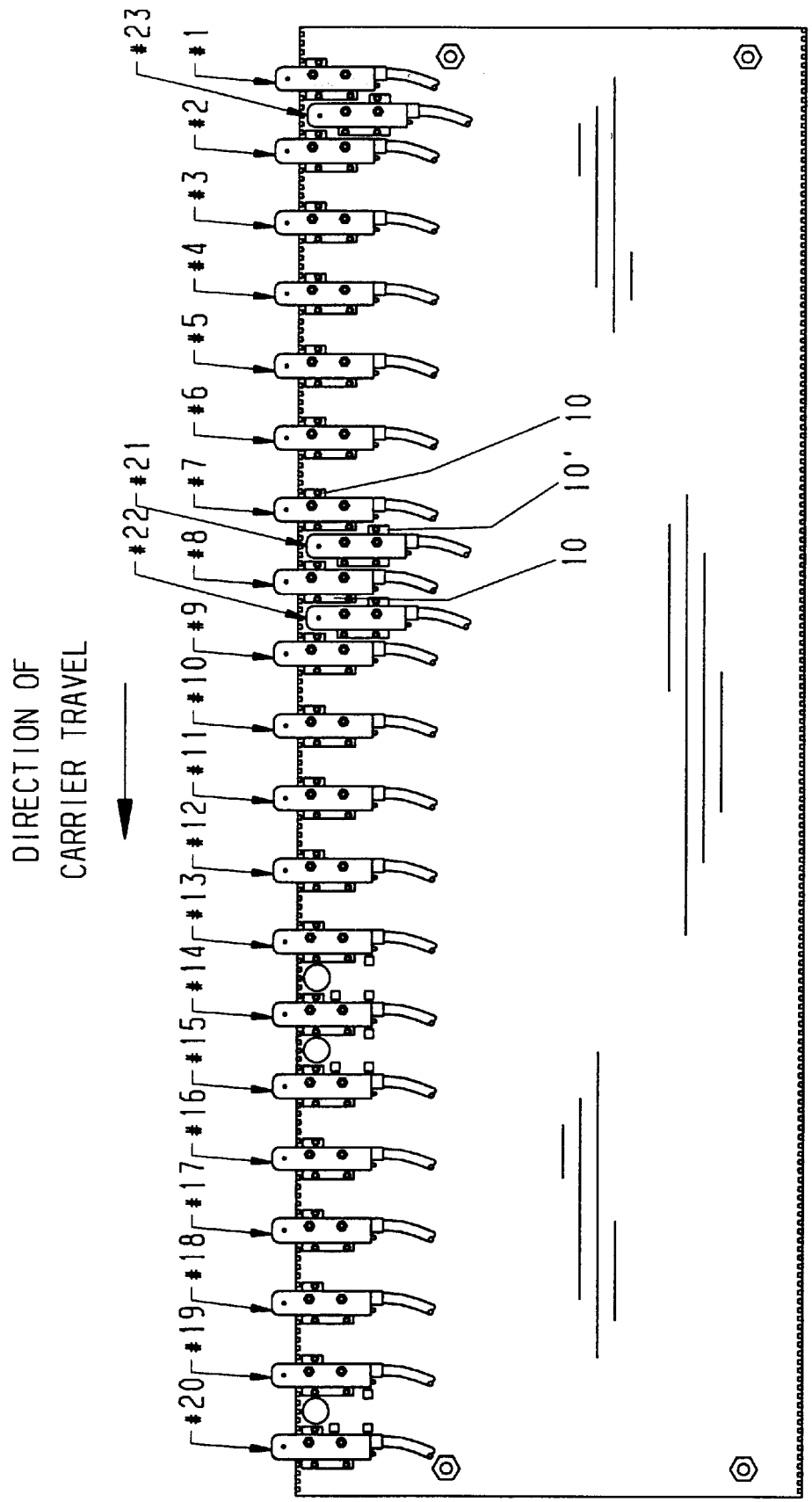
FIG. 5 is a side, elevational view of a conveyor shown with 23 alignment devices attached according to various aspects of the present invention.

In the alternate embodiment of alignment device 10' depicted in FIGS. 3 and 4, like elements are depicted by like primed numbers. The alignment device 10' depicted in FIGS. 3 and 4 is the same as that depicted in FIGS. 1 and 2, except for the configuration of the adjusting screws in mounting plate 40. In particular, adjustment screws 37b' and 37c' are horizontally aligned. Adjustment screw 37b' therefore is used to set the desired spring force. Thereafter, adjustment screw 37a' is used for vertical adjustment while adjustment screw 37c' is used for horizontal adjustments. The different configuration of alignment device 10' allows it to be closely positioned in between alignment devices 10 on the side of a conveyor as depicted in FIG. 5.

It will be understood by those skilled in the art that other configurations can be used. Right triangles, however, are preferable because they allow for independent adjustment of the vertical and horizontal alignment. It will also be understood that mounting plate 40 could be fixedly attached to adjustment screws 37 to thereby avoid the necessity of tensioning springs 38. Without tensioning springs 38, the potential problem of spring fatigue over time could be avoided.

While the present invention has been described in terms of the preferred embodiment depicted in the drawings and discussed in the above specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. An alignment device, comprising:
   a mounting bracket adapted to support a photoemitting device;
   a fixed bracket; and
   a plurality of adjustment members attached to at least one of said mounting bracket and said fixed bracket, said adjustment members adapted to alter the orientation between a photoemitting device in said mounting bracket and said fixed bracket independently in two mutually orthogonal planes.

2. The alignment device of claim 1 further including a separation member mounted between said mounting bracket and said fixed bracket, said separation member adapted to bias said mounting bracket away from said fixed bracket.

3. The alignment device of claim 2 where said separation member comprises springs mounted around each of said adjustment members.

4. The alignment device of claim 1 further including a photoemitting device attached to said mounting bracket.

5. The alignment device of claim 1 wherein said adjustment members include a plurality of screws inserted through holes defined in said mounting bracket and said fixed bracket.

6. The alignment device of claim 5 wherein said plurality of screws have heads, and said heads are located adjacent said mounting bracket and facing away from said fixed bracket.

7. The alignment device of claim 6 further including a plurality of locking nuts attached to said fixed bracket into which said plurality of screws are inserted.

8. The alignment device of claim 7 wherein said plurality of screws comprise three screws.

9. The alignment device of claim 8 wherein said three screws are arranged on said mounting bracket to form a right triangle when a line is drawn connecting the screws.

10. The alignment device of claim 5 wherein said photoemitting device is adapted to emit optical signals in a direction parallel to the direction of said screws.

11. The alignment device of claim 10 wherein said fixed bracket is adapted to be mounted alongside a conveyor.

12. The alignment device of claim 11 wherein said mounting bracket has a photoemitting device attached thereto that is adapted to have a signal emitted from said photoemitting device be reflected back to said photoemitting device by a reflector positioned alongside said conveyor on a side opposite said photoemitting device such that articles traveling on said conveyor are impinged by said emitted signal.

13. A method for aligning a device that emits a signal with a target to be impinged by said signal, comprising:
   providing a device that emits a signal;
   providing a fixed bracket and a movable bracket; and
   adjusting the orientation of said device that emits the signal with respect to said fixed bracket in two mutually orthogonal planes.

14. The method of claim 13 including spacing said movable bracket away from said fixed bracket by a plurality of screws.

15. The method of claim 14 wherein said adjusting the orientation of said movable bracket with respect to said fixed bracket comprises rotating at least one of said screws.

16. The method of claim 14 further including positioning a spring around each of said screws between said plate and said fixed bracket.

17. The method of claim 13 wherein said device that emits a signal is a photoemitting device.

18. A method for aligning a photo-detector positioned alongside a first side of a conveyor with a target positioned alongside a second side of the conveyor, comprising:
   providing at least three locking nuts adapted to receive screws;
   mounting said photo-detector to a movable bracket having at least three holes oriented to define the vertices of a right triangle;
   inserting said screws through each of said at least three holes;
   inserting said screws into said locking nuts;
   securing said locking nuts to said first side of said conveyor;
   positioning at least three springs around said at least three screws between said plate and said locking nuts; and
   rotating said screws to change the orientation of said movable bracket with respect to said first side of said conveyor.

19. A photo-detector alignment device for a conveyor comprising:
- a photo-detector;
- a mount attached to said photo-detector, said mount defining at least two apertures;
- a bracket affixed to the conveyor, said bracket defining at least two apertures;
- at least two screws, each of said screws inserted through one mount aperture and one bracket aperture, said screws threadedly secured in one of the mount apertures and the bracket apertures, said screws nonthreadedly secured in the other of the mount apertures and the bracket apertures, said at least two screws adapted to independently adjust the alignment of said photo-detector in two mutually orthogonal planes.

20. The photo-detector alignment device of claim 19 further including at least one resilient member positioned between said bracket and said mount.

21. The photo-detector alignment device of claim 20 wherein said resilient member is a spring.

22. The photo-detector alignment device of claim 21 further including a spacer positioned between, and affixed to, said mount and said bracket.

23. The photo-detector alignment device of claim 22 wherein said at least two apertures and said spacer are arranged on said mount to define the vertices of a right triangle.

24. The photo-detector alignment device of claim 23 wherein said spacer is positioned at the right vertex of said right triangle.

25. The photo-detector alignment device of claim 23 wherein said spacer comprises another screw inserted through apertures on said mount and said bracket.

26. The photo-detector alignment device of claim 19 further including a plurality of locking nuts attached to said bracket, said locking nuts positioned on said bracket to receive said screws.

27. The device of claim 9 wherein said holes defined in said fixed bracket through which said screws are inserted are threaded for threaded engagement with said screws.

* * * * *